US006915898B2

(12) United States Patent
Becker et al.

(10) Patent No.: US 6,915,898 B2
(45) Date of Patent: Jul. 12, 2005

(54) OPTICAL DISK CONTAINER WITH INTEGRATED MARKING DEVICE

(75) Inventors: Craig Henry Becker, Austin, TX (US); Wayne Elmo Vicknair, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 10/394,323

(22) Filed: Mar. 20, 2003

(65) Prior Publication Data

US 2004/0182725 A1 Sep. 23, 2004

(51) Int. Cl.[7] .......................... B65D 85/57; B65D 85/28
(52) U.S. Cl. ..................... 206/310; 206/303; 206/308.1
(58) Field of Search ............................. 206/303, 308.1, 206/310, 493

(56) References Cited

U.S. PATENT DOCUMENTS 5,590,971 A 1/1997 Melnick ..................... 401/202
6,625,959 B2 * 9/2003 Gordon et al. ................ 53/471
2001/0050239 A1 * 12/2001 Ishii ........................ 206/308.1
2003/0098251 A1 * 5/2003 Yang .......................... 206/303

FOREIGN PATENT DOCUMENTS

JP 11240132 A 9/1999 ........... B41F/17/36

* cited by examiner

*Primary Examiner*—Bryon P. Gehman
(74) *Attorney, Agent, or Firm*—Duke W. Yee; Jeffrey S. LaBaw; Betty Formby

(57) ABSTRACT

A media storage device for retaining media, such as optical disk media. The device includes a base and a spindle projecting from the base. The spindle is configured to receive optical disks around the outer surface of the spindle. The spindle also includes an opening to a channel within the spindle. This opening allows a marking device to pass through the opening into the channel and allows the marking device to be retained in the spindle.

23 Claims, 3 Drawing Sheets

112
126
108
110
116
118
106
104
114
120
122
128
132
134
130 124
102

OPTICAL DISK CONTAINER WITH INTEGRATED MARKING DEVICE

BACKGROUND OF THE INVENTION

1. Technical Field

The present invention relates generally to an improved storage device and in particular to an apparatus for holding optical disk media.

2. Description of Related Art

In the past few years, the use of compact discs for musical and other recordings became widely available and popular. Further with the availability of recordable CDs, such as CD-Rs and CD-RW media, consumers are purchasing blank recordable CDs to back-up data and record music. Recordable media are packaged using different types of containers. The typical container is either square shaped or round shaped with a base. A spindle or rod extends upward from the base allowing optical disks to be retained within the container.

Consumers who purchase this recordable media often mark the media after writing data or music onto media. Typically, the consumer will either print a label and put it on the disk or mark the disk directly with a marking device, such as a pen with ink suitable for marking on a disk. Labels are aesthetically pleasing, but can be time consuming and difficult to print. On the other hand, marking directly on a disk with a pen or other marking device is a quick way to mark a disk for identification. Not all pens are suitable for marking on a disk. For example, ballpoint pens should not be used because these type of pens may gouge the top layer of the disk on most optical media. With some types of optical media, such as CD-R disks, solvent based inks will eat through the base or lacquer coat and destroy the disk. Many consumers do not know what type of pen is appropriate for a particular type of disk. Thus, consumers may mark on a disk with an inappropriate pen and damage the disk.

Even if the consumer knows what type of pen to use, an appropriate pen for marking disks is not always readily available. Oftentimes, a person creating CDs may have to hunt and look for a pen suitable for marking on an optical disk. Such a pen may not be readily available for a variety of reasons, such as, for example the consumer may not have purchased an appropriate pen, the consumer may have misplaced the pen, or someone else may have taken the pen.

Therefore, it would be advantageous to have an improved apparatus for storing optical storage media and a marking device.

SUMMARY OF THE INVENTION

The present invention provides a media storage device for retaining media, such as optical disk media. The device includes a base and a spindle projecting from the base. The spindle is configured to receive optical disks around the outer surface of the spindle. The spindle also includes an opening to a channel within the spindle. This opening allows a marking device to pass through the opening into the channel and allows the marking device to be retained in the spindle.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
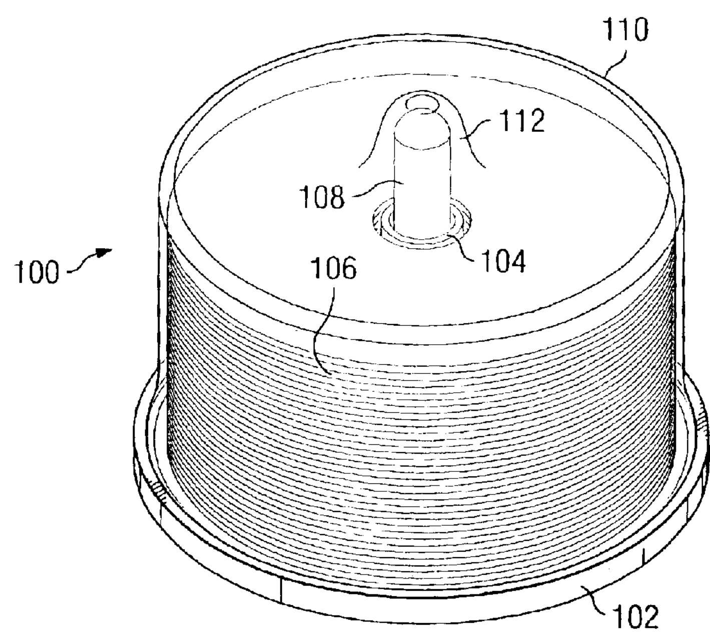
FIG. 1 is a diagram of a perspective view of an optical disk container in accordance with a preferred embodiment of the present invention.

With reference now to the figures, and in particular with reference to FIG. 1, a diagram of a perspective view of an optical disk container is depicted in accordance with a preferred embodiment of the present invention. The present invention provides an improved media container for media, such as optical disks. These optical disks may be, for example, recordable compact disks (CD[s]), such as CD-Rs or CD-RWs. Other optical media include, for example, recordable digital versatile disks (DVD[s]). The present invention includes an apparatus for allowing a marking device to be integrated with the container. In this manner, a user may place the marking device into the container such that the marking device is readily available for use when the user is ready to mark the media. By providing a mechanism in the optical disk container to retain the marking device, a user is less likely to misplace or lose a marking device.

In this example, optical disk container 100 includes a base 102 and a spindle 104. Spindle 104 is attached to, or projects from, base 102 in a substantially perpendicular orientation to base 102. As illustrated, base 102 and spindle 104 are circular in shape. Depending on the particular implementation, base 102 may take other shapes, such as a square or triangle. Optical disks 106 are stacked on base 102 around spindle 104. Additionally, optical disk container 100 also includes pen 108, which is placed into spindle 104. Optical disk container 100 also includes cover 110, which fits over base 102 and spindle 104. Cover 110 also encloses pen 108 in section 112, which protrudes upward.

Figure 2:
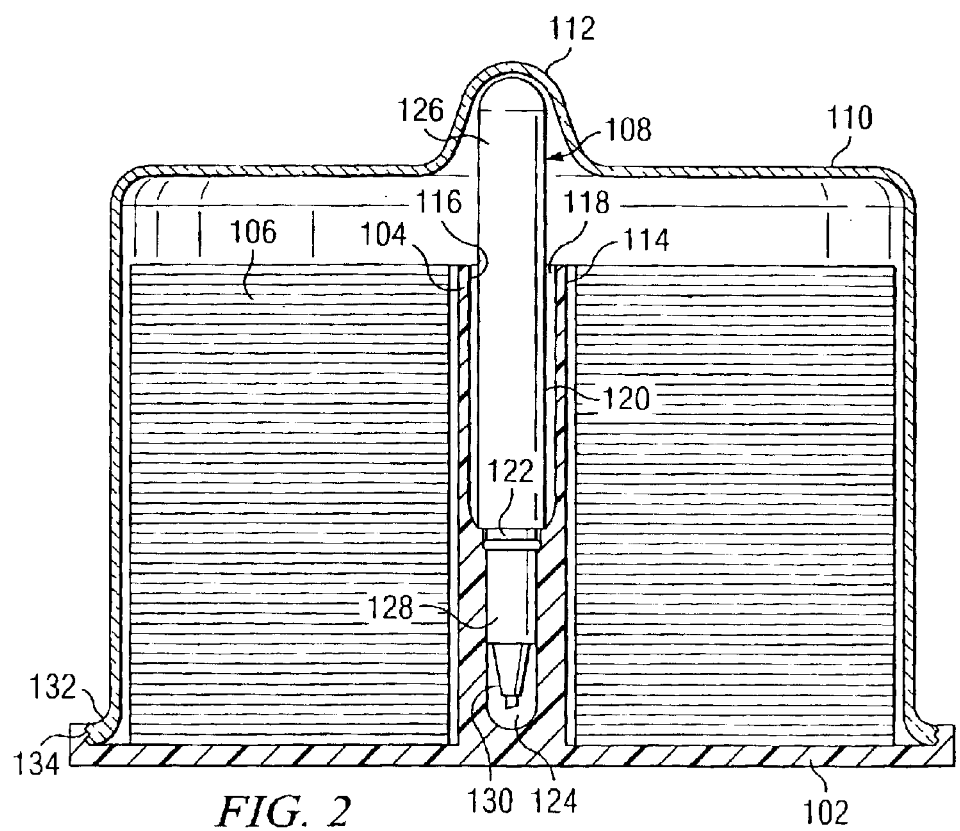
FIG. 2 is a cross sectional view of the optical disk container illustrated in FIG. 1 in accordance with a preferred embodiment of the present invention.

Next, FIG. 2 is a cross sectional view of the optical disk container illustrated in FIG. 1 in accordance with a preferred embodiment of the present invention. Spindle 104 includes outer surface 114 and inner surface 116. Outer surface 114 is the surface around which optical disks 106 are placed around the spindle 104. In particular, optical disks 106 include holes in the center. Spindle 104 is placed through these holes to retain optical disks 106.

Opening 118 in spindle 104 leads to channel 120 containing inner surface 116. In this example, spindle 104 includes opening 122, leading to channel 124. Channel 124 is narrower than channel 120 in these examples.

Channel 120 and channel 124 are configured to receive a marking device, such as pen 108. Pen 108 includes first barrel portion 126 and second barrel portion 128. Second barrel portion 128 is narrower in diameter than first barrel portion 126. Pen 108 also includes tip section 130. Channel 120 is configured to receive and hold first barrel portion 126 when pen 108 is inserted into spindle 104 through opening 118. Channel 124 is configured to receive and hold second barrel portion 128 and tip section 130 when pen 108 is placed into spindle 104 through opening 122.

In this example, channel 124 acts as a lid or cover for tip section 130 of pen 108. A user may insert pen 108 into spindle 104. Spindle 104 is configured to receive and retain pen 108. In this manner, a user is less likely to misplace 108 because of the convenient and easy-to-use holder provided through spindle 104.

As illustrated in these examples, base 110 includes edge 132. This edge is configured to receive lip 134 on cover 110 to hold cover 110 in place. When cover 110 is placed onto base 102, cover 110 encloses optical disks 106, as well as pen 108, in optical disk container 100. Of course, depending on the particular implementation, cover 110 may include a hole in section 112, instead of a protrusion to allow for pen 108 to protrude or stick out of cover 110.

Additionally, in this example, pen 108 protrudes from spindle 104. In some implementations, it may be desirable to have pen 108 fits completely inside spindle 104. Further, pen 108 also may be placed, such that tip section 130 sticks out of spindle 104, rather than being placed first into opening 118 in spindle 104. In such an implementation, an additional cap or cover is provided for pen 108 because spindle 104 does not perform this function with this particular orientation of pen 108.

Figure 3:
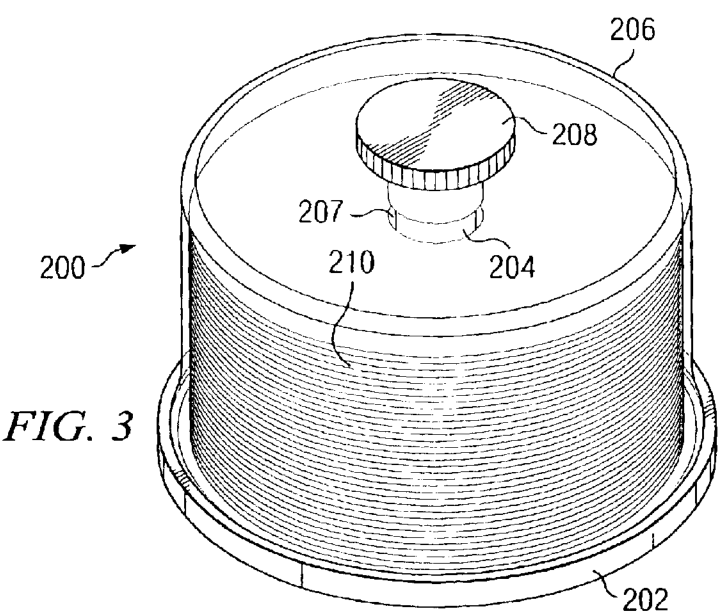
FIG. 3 is a diagram illustrating a perspective view of an optical disk container in accordance with a preferred embodiment of the present invention.

With reference now to FIG. 3, a diagram illustrating a perspective view of an optical disk container is depicted in accordance with a preferred embodiment of the present invention. In this example, optical disk container 200 includes base 102 with spindle 204 projecting from base 202. Cover 206 includes opening 207 through which cap 208 may be placed to secure cover 206. These components are used to receive and contain optical disks 210. Optical disk container 200 also includes an integrated pen, which is not shown in this figure, because the pen is contained entirely within spindle 204 when cap 208 is secured to spindle 204.

Figure 4:
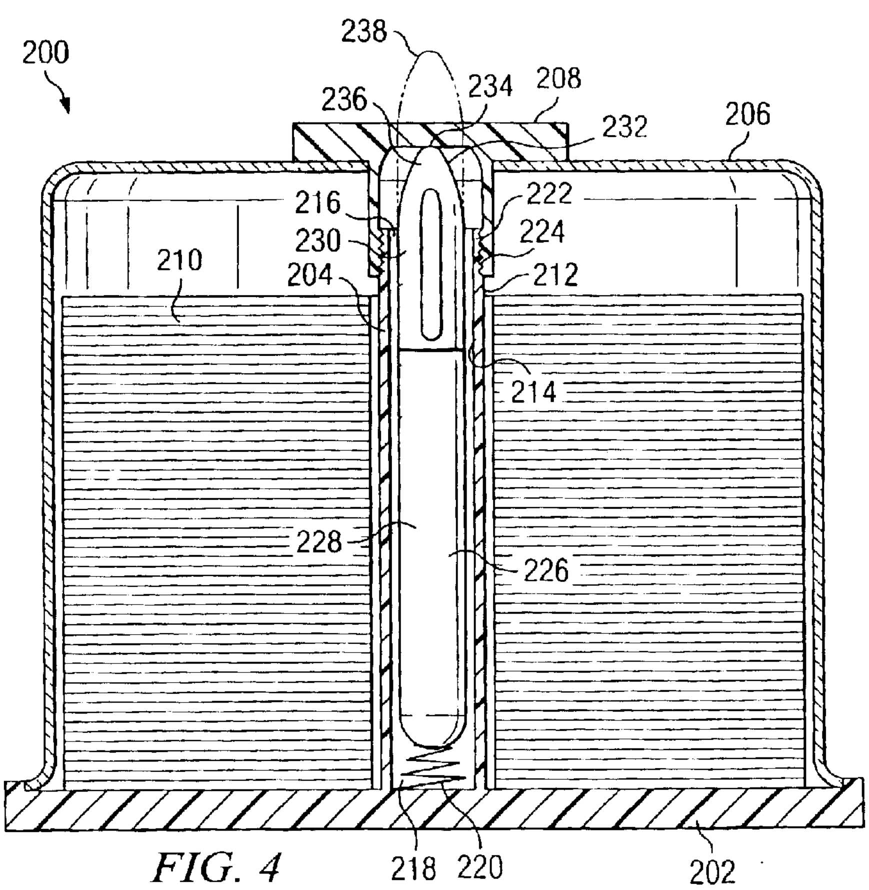
FIG. 4 is a diagram illustrating a cross sectional view of optical disk container 200 in FIG. 3, in accordance with a preferred embodiment of the present invention.

Turning now to FIG. 4, a diagram illustrating a cross sectional view of optical disk container 200 in FIG. 3 is depicted in accordance with a preferred embodiment of the present invention. Spindle 204 includes outer surface 212 and inner surface 214. Outer surface 212 is the surface around which disks 210 are placed. Opening 216 in spindle 204 provides a connection to channel 218 for inner surface 214. Spring 220 is located at the far end of channel 218 opposite of opening 216. Spindle 204 also includes threaded surface 222, which is configured to engage threaded surface 224 in cap 208.

Pen 226 includes pen barrel 228 and pen cap 230. In this example, pen barrel 228 of pen 226 is inserted first into channel 218 through opening 216 such that pen cap 230 points towards opening 216. A mechanism, such as spring 220, biases or pushes pen barrel 228 of pen 226 upward towards opening 216 when pen 226 is placed into channel 218 through opening 216.

Pen 226 is contained entirely within channel 218 when cap 208 is secured onto spindle 204 by the engagement of threaded surface 222 with and threaded surface 224. In other words, cap 208 is rotated to secure cap 208 to spindle 204. As cap 208 is secured onto spindle 204, inner surface 232 at end 234 of cap 208 biases or pushes tip 236 of pen cap 230 into channel 218. When cap 208 is removed, pen 226 is biased into a position in which pen cap 230 may be seen outside of spindle 204 as illustrated by phantom line 238.

In this manner, optical disk container 200 provides an integrated marking device for use with containers for optical disk media. With this mechanism, users are less likely to misplace or lose a marking device, such as pen 226 because optical disk container 200 provides an easy-to-use penholder within spindle 204. Additionally, this mechanism allows for pen 226 to be completely enclosed within optical disk container 200.

Figure 5:
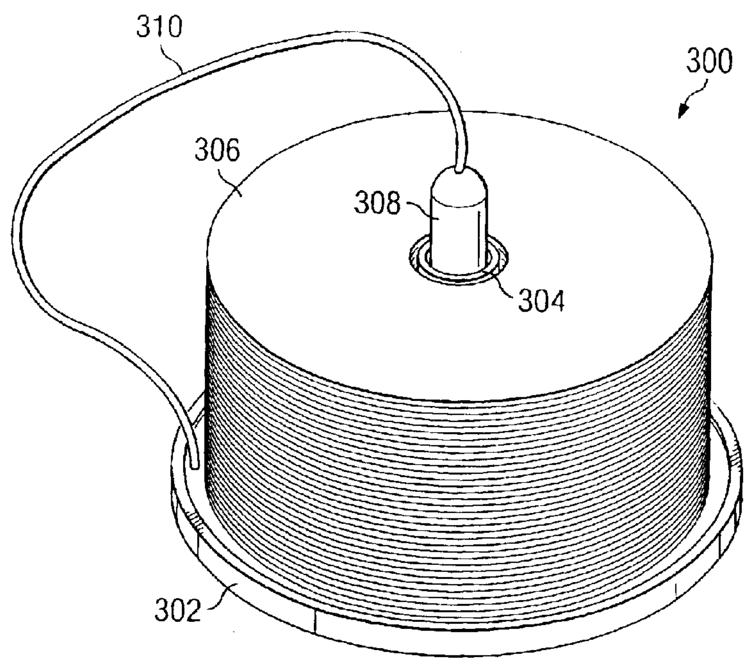
FIG. 5 is a diagram illustrating the perspective view of an optical disk container including a tether.

Next, FIG. 5 is a diagram illustrating the perspective view of an optical disk container including a tether. In this example, optical disk container 300 includes base 302 and spindle 304. Optical disks 306 are placed onto base 302 around spindle 304. In this example, pen 308 is inserted into spindle 304 in a fashion similar to pen 108 in FIGS. 1 and 2. In this example, an additional feature is included to reduce the possibility that pen 308 becomes misplaced or lost. Tether 310 is included to secure pen 308 to optical disk container 300. In this example, tether 310 is attached to base 302. Tether 310 may take various forms. For example, tether 310 may be comprised of string, nylon, rubber, or chain links. Tether 310 may be stretchable or detachable. In addition, tether 310 may be retractable, such that tether 310 remains tight when pen 308 is inserted into spindle 304. In the instance in which tether 310 is detachable, such a feature allows for other pens to be connected to tether 310.

As illustrated in FIG. 5, optical disk container 300 provides an additional feature to help users avoid misplacing or losing a marking device, such as pen 308. Tether 310 provides this feature. With tether 310, a user is less likely to misplace pen 308 because pen 308 is securely attached to optical disk 300.

Figure 6:
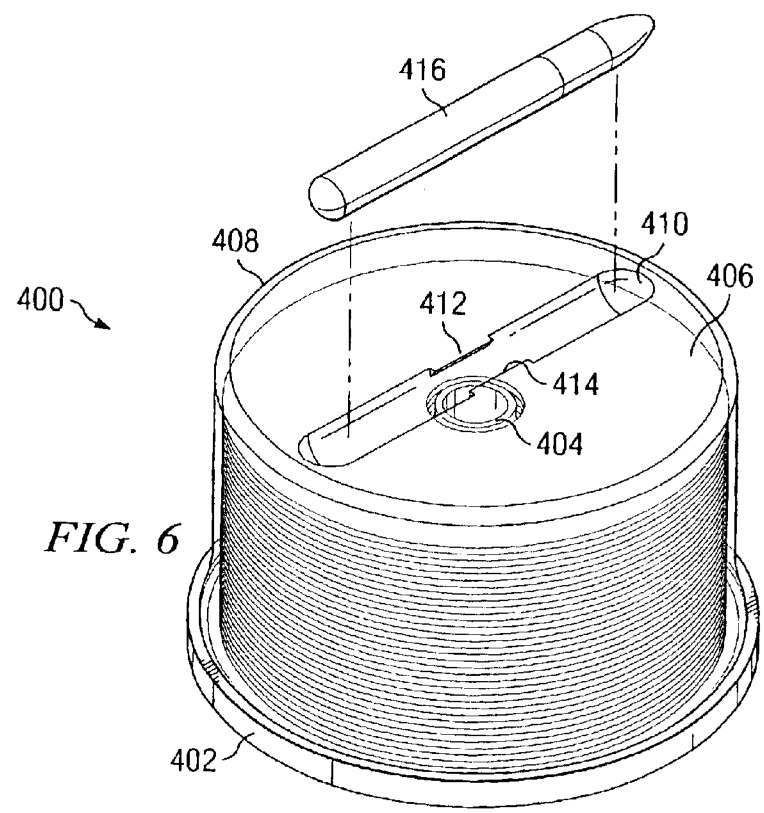
FIG. 6 is an illustration of an optical disk holder in accordance with a preferred embodiment of the present invention.

In FIG. 6, another illustration of an optical disk container is depicted in accordance with a preferred embodiment of the present invention. Optical disk container 400 includes base 402 and spindle 404. Optical disks 406 are placed onto base 404 around spindle 404. In this example, cover 408 includes a channel 410, along with retaining flange 412 and retaining flange 414, channel 410 is configured to receive pen 416. Retaining flange 412 and retaining flange 414 are configured to hold pen 416 in channel 410.

Optical disk container 400 provides an integrated pen feature in which pen 416 is retained in channel 410 of cover 408. This feature allows for a user to keep pen 416 with optical disk container 400. In this manner, pen 416 is less likely to become lost or misplaced.

Additionally, pen 416 may be located in other orientations on cover 408. For example, pen 416 may be located on the side of cover 408 in a vertical orientation with respect to base 402. In other implementations, pen 416 could be located or integral to base 404. In such an example, base 404, may have a different shape, such as a square or triangular shape, with pen 416 being integrated into one of the sides of base 404. With this type of configuration, pen 416 may be biased to allow for this pen to be ejected or pushed away from base 416 for use in marking optical disks 406.

The pens illustrated in the different figures may take various forms. For example, it may be desirable to include a pen that allows for colors to be changed. One type of pen that allows for changes of colors is a stacking pen in which the tip of one portion of the pen forms a cap for the next tip of the pen. In this type of pen, each tip provides a different color. Further, some implementations may provide an ability to hold or receive multiple pens. In such an implementation, the pens may contain different colors. Further, the pen may have different shapes. For example, the barrel of the pen may have a triangular or oval shape.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An optical media storage device comprising:

a base;

a spindle projecting from the base, the spindle having an outer surface, wherein the spindle is configured to receive a plurality of optical disks around the outer surface, wherein the spindle includes an opening to a channel within the spindle, the opening to allow passage of a marking device through the opening and the channel being configured to receive a marking device; and a marking device removeably stored within said spindle;

wherein the marking device includes a barrel and a tip, the channel includes a first section and a second section, the first section is configured to hold the barrel when the marking device is received into the channel, and the second section is configured to act as a cap for the tip of the parking device when the marking device is received into the channel.

2. The optical media storage of claim 1 further comprising:

a cover, wherein the cover is configured to enclose the spindle and the plurality of optical disks when attached to the base.

3. The optical media storage of claim 1, further comprising:

a cover, wherein the cover is moveably attached to the base in which a first position of the cover allows for optical disks in the plurality of optical disks to be removed from the spindle and a second position of the cover encloses the spindle and the plurality of optical disks.

4. The optical media storage device of claim 1, wherein the channel includes an end opposite to the opening and further comprising:

a biasing mechanism for pushing the marking device towards the opening to the channel.

5. The optical media storage device of claim 1 further comprising:

a cap, wherein the cap covers the opening when secured to the spindle.

6. The optical media storage device of claim 1 further comprising:

a tether, wherein the tether is attached to a marking device and to one of the base or a cover attachable to the base.

7. The optical media storage device of claim 6, wherein the tether is made from at least one of string, nylon, rubber, or chain.

8. The optical media storage device of claim 6, wherein the marking device may be detached from the tether allowing another marking device to be attached to the tether.

9. The optical media storage device of claim 1, wherein the channel is configured to receive only a portion of a marking device.

10. The optical media storage device of claim 1, wherein the marking device is a pen containing ink suitable for writing on optical disk media.

11. The optical media storage device of claim 1, wherein the plurality of optical media includes at least one of compact disks and digital versatile disks.

12. An optical media storage device comprising:

a base; and a spindle projecting from the base, the spindle having an outer surface, wherein the spindle is configured to receive a plurality of optical disks around the outer surface;

a marking device; and a cover, the cover having a top, wherein the cover is configured to enclose the plurality of optical disks when attached to the base and wherein the cover includes a channel formed into the top, the channel being configured to receive and retain the marking device;

wherein flanges are formed into the channel such that the flanges retain the marking device when the marking device is placed into the channel.

13. The apparatus of claim 12, wherein the marking device is a pen containing ink suitable for writing on the optical disks such that the ink does not damage the optical disks.

14. An apparatus for holding optical disk media, the apparatus comprising:

a base having a spindle configured to receive a plurality of optical disk media and wherein the spindle includes a void with an opening exposing the void, said spindle having a threaded portion near the opening;

a marking device, wherein the marking device has an elongate shape with dimensions allowing the marking device to be placed through the opening in the spindle into the void; and a cover having a cylindrical projection extending from an inner surface thereof, the cylindrical projection having a threaded portion, wherein, when the cover is seated on the base, the threaded portion of the spindle is arranged to engage with the threaded portion of the cylindrical projection.

15. The apparatus of claim 14, wherein the marking device is tethered to the cover.

16. The apparatus of claim 14, wherein the marking device is moveably connected to the apparatus.

17. The apparatus of claim 14, wherein the marking device is a pen containing ink suitable for writing on the optical disk media such that the ink does not damage the optical disk media.

18. An apparatus for holding storage media, wherein the storage media includes a hole, the apparatus comprising:

a base having a cylinder projecting therefrom, wherein the cylinder includes a void having an opening exposing the void, and an outer surface, wherein the outer surface of the cylinder has a shape configured for receiving the hole in the storage media around the outer surface;

a cover designed to engage with the base and to cover the base, the cylinder, and media stored on the cylinder; and a marking device having an elongate shape, wherein the elongate shape has dimensions allowing the marking device to be received within the cavity of the cylinder, wherein the marking device is tethered to one of the base and the cover.

19. The apparatus of claim 18, wherein the storage media is at least one of a compact disk and a digital versatile disk.

20. The apparatus of claim 18, wherein the marking device is a pen containing ink suitable for writing on the storage media such that the ink does not damage the storage media.

21. The apparatus of claim 18, wherein the void in the cylinder is cylindrical and wherein the elongate shape of the marking device is cylindrical.

22. The apparatus of claim 18, wherein the marking device is tethered to the apparatus.

23. The apparatus of claim 18, wherein the marking device is tethered to the cover.

* * * * *